(12) United States Patent
Woodland et al.

(10) Patent No.: US 8,807,482 B2
(45) Date of Patent: Aug. 19, 2014

(54) TEMPORARILY INSTALLED AIRCRAFT OBSERVER DOOR PLUG, CHAIR, SONOTUBE EJECTION AND CONTROL SYSTEM

(75) Inventors: Richard Woodland, Homosassa, FL (US); Ross James Neyedly, Calgary (CA)

(73) Assignee: 1281329 Alberta Ltd., Calgary (CA)

( * ) Notice: Subject to any disclaimer, the term of this patent is extended or adjusted under 35 U.S.C. 154(b) by 526 days.

(21) Appl. No.: 12/734,158

(22) PCT Filed: Oct. 15, 2008

(86) PCT No.: PCT/US2008/011747
§ 371 (c)(1),
(2), (4) Date: Apr. 14, 2010

(87) PCT Pub. No.: WO2009/051711
PCT Pub. Date: Apr. 23, 2009

(65) Prior Publication Data
US 2010/0206988 A1    Aug. 19, 2010

Related U.S. Application Data

(60) Provisional application No. 60/998,959, filed on Oct. 15, 2007.

(51) Int. Cl.
*B64C 1/14* (2006.01)

(52) U.S. Cl.
USPC .................. 244/129.4; 244/129.5; 244/118.1; 89/37.21

(58) Field of Classification Search
USPC .......... 244/118.2, 137.1, 137.4, 118.1, 129.1, 244/129.5, 129.4, 129.3; 89/1.54, 1.58, 89/1.59, 37.16, 37.17, 37.21, 37.22
See application file for complete search history.

(56) References Cited

U.S. PATENT DOCUMENTS

| | | | | | |
|---|---|---|---|---|---|
| 4,044,364 | A | * | 8/1977 | Prinzo | 396/428 |
| 4,114,839 | A | * | 9/1978 | Sibley et al. | 244/118.1 |
| 4,588,147 | A | * | 5/1986 | Lindsey, Jr. | 24/118.1 |
| 4,746,082 | A | * | 5/1988 | Syms et al. | 244/137.4 |
| 5,927,648 | A | * | 7/1999 | Woodland | 244/118.1 |
| 6,056,237 | A | * | 5/2000 | Woodland | 244/3.15 |

(Continued)

FOREIGN PATENT DOCUMENTS

| | | | | |
|---|---|---|---|---|
| CH | 664333 A5 | * | 2/1988 | B64C 1/28 |
| EP | 1614623 A1 | * | 1/2006 | B64C 1/14 |
| WO | WO 9816421 A1 | * | 4/1998 | B64C 1/20 |
| WO | WO 2009061347 A1 | * | 5/2009 | B64D 47/08 |

*Primary Examiner* — Benjamin P Lee
(74) *Attorney, Agent, or Firm* — Baker Botts L.L.P.

(57) ABSTRACT

The system and apparatus of the present invention is generally comprised of a non-dedicated, temporarily-installed, aircraft observer bubble door, chair, sonotube ejection system, mission electronics LRU rack and workstation assembly which are affixed to the Air Deployment System (ADS) rails, cargo tie down "D" rings, seat belt restraint ring bolt sockets, and litter bar of a host aircraft, thereby precluding the requirement for dedicated airframe modifications. One embodiment of the present invention also utilizes a multi-axis, articulated, foldable chair temporarily-installed in conjunction with a segmented or one piece pressurized observer bubble door plug and door retraction system. Once installed the subject apparatus can be stowed outboard of the fuselage cargo transit envelope to permit use of the ADS rail system in-flight, without affecting normal air drop operations, crew egress, the flight performance envelope, or emergency procedures of the host aircraft.

20 Claims, 14 Drawing Sheets

(56) References Cited

U.S. PATENT DOCUMENTS

| | | | |
|---|---|---|---|
| 6,616,097 B2 * | 9/2003 | Hilbert | 244/118.1 |
| 6,886,773 B2 * | 5/2005 | Peckham et al. | 244/1 TD |
| 6,929,214 B2 * | 8/2005 | Ackleson et al. | 244/1 R |
| 7,387,276 B1 * | 6/2008 | Smith et al. | 244/118.1 |
| 7,610,841 B2 * | 11/2009 | Padan | 89/1.815 |
| 7,726,604 B1 * | 6/2010 | Smith et al. | 244/118.1 |
| 7,726,605 B1 * | 6/2010 | Smith et al. | 244/118.3 |
| 7,806,368 B1 * | 10/2010 | Smith et al. | 244/129.5 |
| 2005/0029398 A1 * | 2/2005 | Lowe et al. | 244/118.1 |
| 2005/0029399 A1 * | 2/2005 | Lowe et al. | 244/118.1 |
| 2006/0284011 A1 * | 12/2006 | Pasty | 244/118.1 |
| 2010/0206988 A1 * | 8/2010 | Woodland | 244/129.5 |

* cited by examiner

TEMPORARILY INSTALLED AIRCRAFT OBSERVER DOOR PLUG, CHAIR, SONOTUBE EJECTION AND CONTROL SYSTEM

This application claims priority to Provisional Application No. 60/998,959 filed on Oct. 15, 2007, the entirety of which is hereby incorporated by reference.

FIELD OF THE INVENTION

This invention relates to a temporarily mounted, portable, modular, aircraft-based scanner chair, bubble door plug, sonotube ejection and workstation assemblies which do not require airframe modifications to accommodate the temporary installation of the manned observation, stores jettisoning, and control systems.

BACKGROUND OF THE INVENTION aircraft-based platforms are ideally suited for time sensitive emergency, as well as routine, sensing, search, monitoring, surveillance and response activities. Among the various types of equipment and methodologies employed to maximize the effectiveness of aircraft employed in these roles include the launch and telemetry control of sonotube compliant stores which can include air launched Miniature Unmanned Aerial Vehicles (MUAV's), smoke markers, illumination flares, communication radios, and Self Locating Data Marker Beacons (SLDMB's) common to those engaged in Search And Rescue operations (SAR). Other aircraft enhancements in support of these missions can also include manned observation systems which utilize specially positioned scanning chairs in conjunction with enlarged glazing surfaces typical of those used for SAR, aerial refueling, and missile scanning functions.

By way of example the Canadian Department Of Defense (DND) operates Lockheed Martin C-130 aircraft which are routinely engaged in SAR operations. DND achieves a limited capability to eject sonotube compliant stores and to undertake manned observation from these aircraft by utilizing a pallet mounted, paratroop door located, temporarily installed, chair and un-pressurized door plug which can be equipped with a hand launched sonotube port and large flush glazed window. Unfortunately, precision stores deployment, Global Positioning System (GPS) location, payload control, and data, audio, or video telemetry from the stores is not possible without undertaking substantial modification to these aircraft. Further, DND cannot achieve Human Factors Engineering (HFE) compliance with Military Standard 1472 using the current palletized chairs or manned scanning techniques employed within the paratroop door plug flush mounted glazing system requires that the chair be positioned forward into the door plug for the SAR technician to achieve peripheral search maximization. The anthropomorphic problems associated with this abnormal and at times prolonged physical position when the observer cannot project his feet beyond the curvature of the fuselage are numerous. By way of contrast the United States Coast Guard (USCG) also uses the Lockheed Martin C-130 for SAR missions. However, the USCG has undertaken substantial Group "A" or permanent modification of their aircraft rear ramps to achieve precision sonotube delivery, telemetry, and control. The USCG also employs a forward pressurized flat glazing observation system with dedicated sonotube launch system located at the observer chair positions forward of the wings abreast both sides aft of the C-130 cockpit bulkhead. Although the USCG has achieved a degree of HFE compliance, again the chair positioning and flat glazing, limit the visual acuity of the observer.

Further, although competent companies like Benson Lund, of Essex, England have designed other observer chairs for stanchion posts, the challenge of integrating a temporarily installed chair with extensive multi-axis HFE compliant positioning capabilities, which can fold away out of the cargo space, and can be sufficiently restrained to the aircraft structure to meet crashworthy loading criteria, does not currently exist.

Further underscoring current deficiencies associated with the control of jettisonable sonotube stores, new technologies exist which enable a host aircraft to launch and receive video and data telemetry from small MUAV's comparable to those manufactured by Advanced Ceramics Research, Inc. of Tucson, Ariz. USA, or as described in U.S. Pat. No. 6,056,237, entitled "Sonotube Compatible Unmanned Aerial Vehicle And System" issued May 2, 2000 to Richard L. K. Woodland, and incorporated herein by reference. The sonotube control interfaces currently employed on USCG aircraft and like C-130 aircraft do not permit the visual analysis or advanced user interface and control of the deployed sonotube payload systems unless a palletized control system comparable to the Palletized Radar Operating System (PROS) currently used by the USCG on their HC-130 "Casper" aircraft can be employed wherein the air drop functions are again compromised due to the co-location of the control system pallet in the rear of the host aircraft cargo bay.

Similar deficiencies in other mission areas also exist wherein U.S. Air Force (USAF) Lockheed Martin MC-130's and U.S. Marine Corp (USMC) KC-130 aircraft regularly engage in nighttime air to air helicopter refueling operations. These missions require that a loadmaster or other crew member visually monitor the refueling operation from the paratroop door location through a small flush window, often in turbulent flight conditions wearing NVG's on a simple fold away non-crashworthy seat which can be also attached to the door. Under these conditions aerial refueling accidents have occurred resulting in lost and damaged aircraft.

Other situations involving hostile missile launch against large slower aircraft comparable to the Boeing C-17 during the critical take-off phase have also resulted in lost and damaged aircraft. In order to counter the vulnerability of aircraft to low altitude man portable missile launch, the USAF air Mobility Command's (AMC) Battle Lab has released a requirement for a manned bubble window observation system to substantially enhance the probability of undertaking successful evasive maneuvers or timely activation of other counter measures.

Further, although several types of aircraft are currently operated with bubble windows and sonotube ejection systems, typically these systems involve dedicated modifications that require a fleet of aircraft be modified to maintain mission readiness. Hence in most cases because these manned observation and sonotube mission kits are costly to install and upgrade, they are usually undertaken in the context of "minimum but adequate" and suffer performance deficiencies in light of optimal capabilities which could be achieved with fewer advanced technologies that are not permanently dedicated to one aircraft.

In pursuit of a prior solution, an aircraft door compatible manned observation and sonotube ejection system was described in U.S. Pat. No. 5,927,648, entitled "aircraft Based Sensing, Detection, Targeting, Communications, and Response Apparatus" issued Jul. 27, 1999 to Richard L. K. Woodland, and incorporated herein by reference. Although the Woodland invention can be able to accommodate temporary mounting of the system described in U.S. Pat. No. 5,927, 648 without incurring airframe modifications, it is completely reliant on a "mounting pallet" for installation which compromises all other backend air drop operations when the system is installed. Further, the Woodland patent does not address the temporary installation of an integrated door plug retraction system, multi-axis articulation of the observer chair, collapsible workstation, or unique form factor electronics and processing racks independent of a pallet assembly.

Currently prior art, and practices associated with resolution of the aforementioned deficiencies are inadequate, costly, preclude simultaneous air drop operations, inhibit upgrade, increase the probability of aircraft accidents during refueling operations and leave large slow moving cargo aircraft vulnerable to low altitude missile threats. Accordingly there is an on-going, unaddressed need to achieve a flexible, rapidly installed, non-dedicated airborne manned observation and sonotube launch and control system mounting methodology for fixed and rotary wing cargo aircraft that does not interfere with air drop operations, and does not require a pallet for installation.

SUMMARY OF THE INVENTION

The apparatus and system of the present invention solves the aforementioned problems associated with temporarily mounted, aircraft manned observation and sonotube launch and control systems without compromising air drop functionality by utilizing a variety of rapidly installed adaptive mounting plates which interface with the host aircraft's Air Deployment System (ADS) rails, the cargo floor tie down rings, seatbelt ring sockets and the emergency crew litter bar, thereby precluding the requirement for a mounting pallet. The various mounting plate apparatus(s) can also be configured to match the cargo floor tie down rings or tie down ring bolt socket patterns of a given host aircraft in lieu of an ADS rail interface. In accord with the foregoing, one embodiment of the present invention integrates the simultaneous mounting, use, and stowage for in flight cargo aircraft operations of a pressurized bubble door plug, a door plug retraction system, an articulated multi-axis observer chair, a sonotube launch system, one or more electronics LRU racks, a collapsible workstation, and a chair mounted collapsible remote operator control interface.

As the initial and primary component of the assembly summation, the bubble door plug of the present invention can be indented about its lower periphery to accommodate the simultaneous mounting and transit under the door of a special mission strut and pod assembly described under a separate patent referenced herein as being simultaneously filed with the U.S. Patent And Trademark Office (USPTO) by Neyedly and Woodland. When not using the strut assembly, the orifice created in the lower part of the pressurized door plug can be sealed with a close out panel to permit aircraft pressurization. The door plug can also be segmented into two interlocking panels which permit modularity and rapid re-configuration of the respective panels in minutes. The HFE designed door assembly in either single or segmented configurations when using an observation bubble incorporates a segmented two part window with a bubble window in the upper section, a solid kick panel in the lower part of the bubble for the observers feet, and also accommodates the installation within the door plug of a heater/cooler unit manufactured by Cox & Co. of New York, N.Y., USA, which provides temperature controlled air to a diffuser located within the bubble window. A spring loaded counterbalance door plug retraction system has also been devised for use with one embodiment of the current invention which can be temporarily installed and used without removing the permanent aircraft door or retraction system. The door plug also accommodates the simultaneous mounting of ballistic armor protection, a guided weapon infra red/radar Electronic Warfare Self Protection (EWSP) system, a stowable sonotube iris valve and launch tube, a black out curtain, a night vision goggle (NVG) compatible gooseneck light, a stowable observer leaning bar, and an environmental/lighting control panel.

As an additional component comprising the assembly summation, a sonotube launch system can be attached to the door which incorporates an iris valve which can be engaged or disengaged to permit launch of various payloads while the aircraft is in a pressurized or un-pressurized condition. The sonotube launch system incorporates a simple air bag expansion technology housed within a small compressed air cartridge which was developed by Sea Corp, of Middletown, R.I., USA for the U.S. Navy LAMPS Helicopter. The Sea Corp mechanism eliminates the requirement for large bulky sonotube pressurization systems or dangerous pyrotechnic discharge devices which are currently used on U.S. Navy Lockheed Martin P-3's and other aircraft. The sonotube launcher can be also hinged and can be stowed in flight on the side of the door or removed completely when not required or air drop activities are in progress.

One embodiment of the present invention further incorporates a multi-axis HFE designed stanchion post mounted observer chair as manufactured by Benson Lund of Essex, England and AirDyne R & D of Calgary Alberta, Canada, which can be stowed completely outboard of the cargo transit envelope in the rear of the aircraft, and deployed for use in several positions as may be required by the mission or aircraft operational requirements. For example, for take-off and landing the chair can be positioned rearwards to comply with crashworthy 16 "G" requirements, or forward to use a workstation, or facing outboard for search operations, or 45 degrees aft or forward for aerial refueling and missile scanning functions. The chair being HFE compliant also incorporates operator controlled vertical, horizontal, lumbar, and armrest adjustment devices. Other attributes of the current chair of the present invention include ballistics armor, and the ability to mount remote sonotube or sensor system control interfaces on the armrests without permanently modifying the aircraft.

One embodiment of the present invention also incorporates simultaneous mounting and use of various mission electronics LRU rack assemblies, and a collapsible workstation with a collapsible remote chair mounted user control interface. The workstation assembly can be mounted to the top of a reduced height mission electronics LRU rack and can be further articulated and divided into four modules which are hinged such that the workstation can be disconnected for removal in whole or part, or can also be stowed when not in use to permit air drop operations. Due to crew survivability requirements and the possibility of mounting the workstation assembly at varying locations within a host aircraft, the workstation of one embodiment of the present invention also incorporates a self contained recessed operator oxygen supply, mask, and control system.

The integrated system of one embodiment of the present invention also incorporates connectivity to and utilization of, other ditching hatches on the host aircraft which serve as temporary non-dedicated mounting surfaces for Over The Horizon (OTH), or Line Of Sight (LOS) antennas in support of communications, navigation, and positioning support requirements without sacrificing emergency crew egress or requirement for interfacing with the mission LRU rack assemblies and the onboard aircraft electronic data bus. Further the complete system of the present invention may utilize various iron lung, medical litter, missile, winch, auxiliary or other existing electrical power interface receptacles to drive the various components and mission systems of the present invention on the host aircraft negating the requirement for dedicated electrical system modifications.

The simultaneous installation of the assembly as described herein comprising one embodiment of the present invention can be removable, stowable, modular, rapidly installed, does not interfere with backend aircraft operations, does not compromise emergency crew egress, and does not require a pallet or aircraft modifications to enable its use on the ground or in flight. The integration of the aforementioned components and assemblies in the non-dedicated manner embodied within the overall manned observation and sonotube launch and control system described herein, resolves the cited deficiencies to provide the desired portability, commonality, and modularity to enable cost effective utilization of advanced technologies incorporated within the invention, across multiple aircraft types.

DETAILED DESCRIPTION OF THE INVENTION

The invention is now described in terms of the FIGURES to more fully delineate in detail the scope, materials, components, conditions, and methods associated with the design, and deployment of the present invention. Many of the parts and components of the present invention are hereinafter described as being "assemblies". As used herein, the word "assembly" or "assemblies" refers to the totality of related parts and pieces associated with a given component and its operability and is not to be construed as limiting to a particular piece, part, or operation.

The description herein is made with the understanding that the skilled person in the field of designing and using aircraft-based platforms for sensing, search, monitoring, surveillance and response activities, is familiar with standard aircraft features such as various structural elements including side doors, side door operations, floor tie down elements and systems, air deployment system (ADS) rails, and the like, primarily as utilized on C-130 aircraft. No detailed description of such features is believed necessary to enable one skilled in the art to understand and implement the present invention.

In general the invention comprises a novel design and integration approach to the configuration, capability, and installation of an aircraft independent, portable, manned observation and sonotube launch and control assembly as used in SAR, oil spill characterization, aerial refueling, missile scanning, and other airborne missions.

Figure 1:
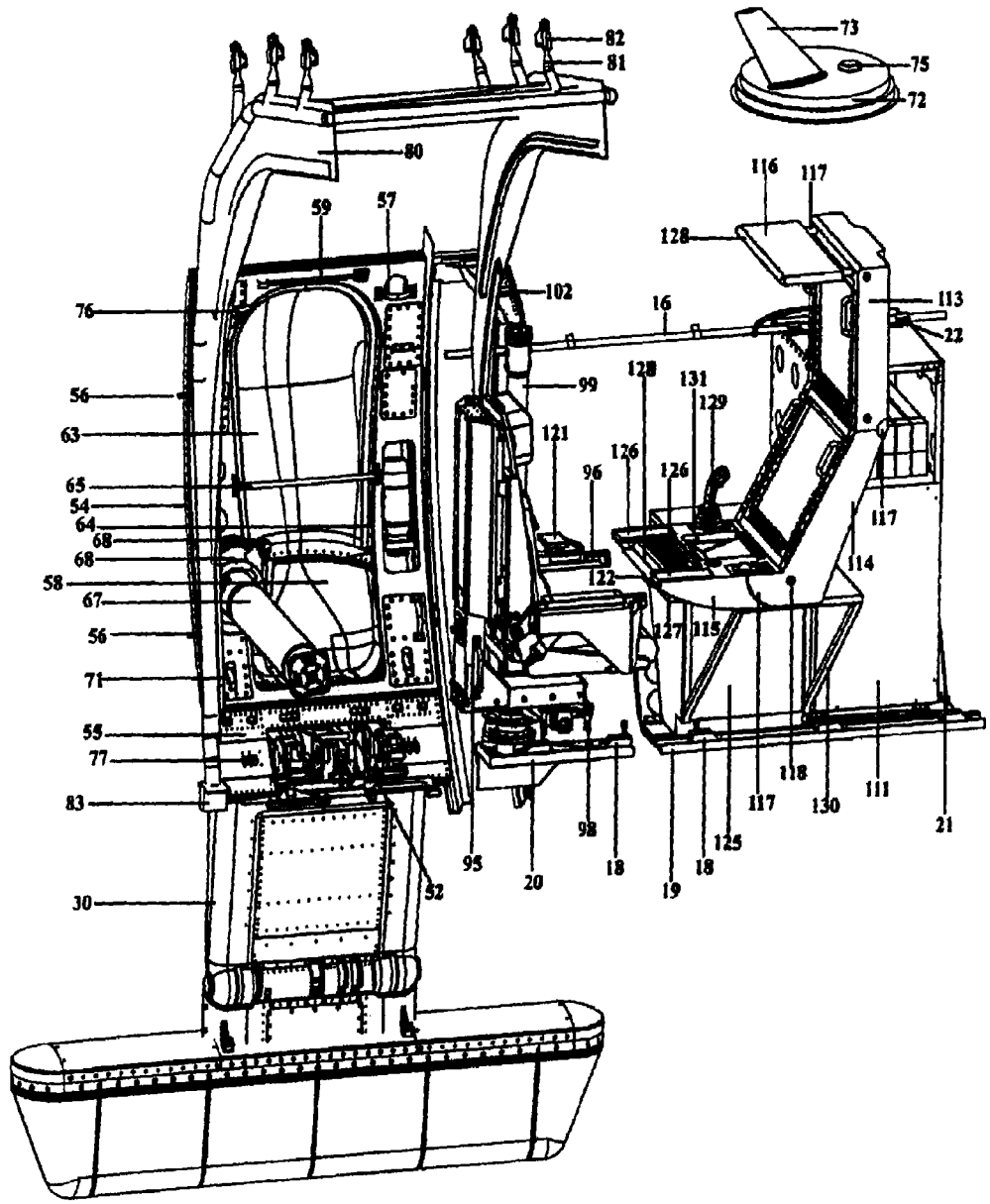
FIG. 1 is a perspective view of the complete assembly of all primary components of the subject system apparatus depicted with a special mission strut mounted beneath the pressurized two piece segmented and indented door plug with all components in the deployed and operable position as could normally be installed on the left side of the host aircraft.
Figure 2:
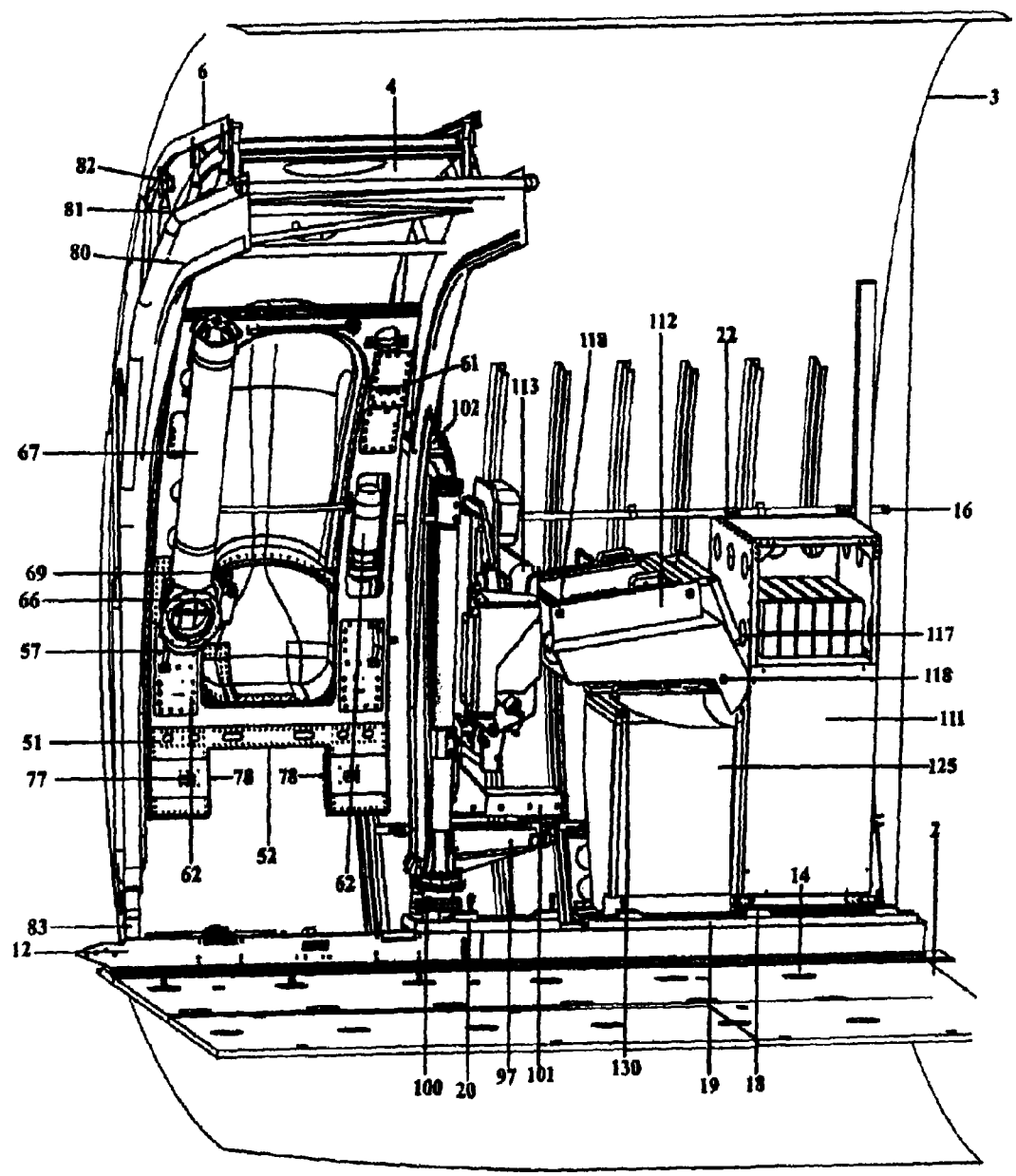
FIG. 2 is a perspective view of the complete assembly of all primary components of the subject system apparatus with attachment details, for an ADS rail equipped aircraft, depicted with all components in the retracted and stowed position utilizing a single piece indented door plug with close out panel installed as depicted in the open position on the left side of the host aircraft.
Figure 3:
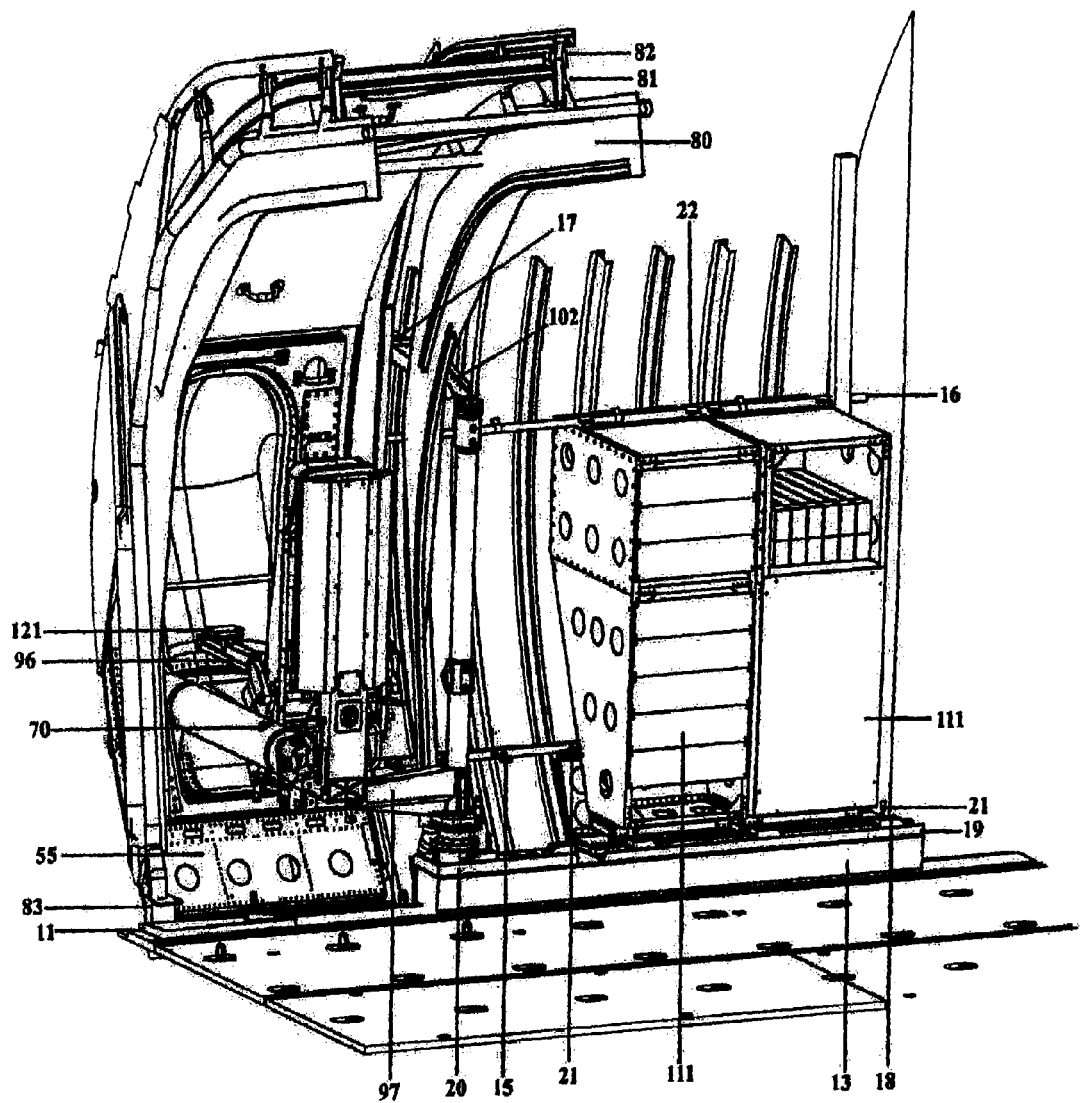
FIG. 3 is a perspective view of the complete assembly of all primary components of the subject system apparatus with attachment details, depicted in the deployed and operable position as mounted to the cargo floor restraint rings of a host aircraft not equipped with ADS rails.
Figure 4:
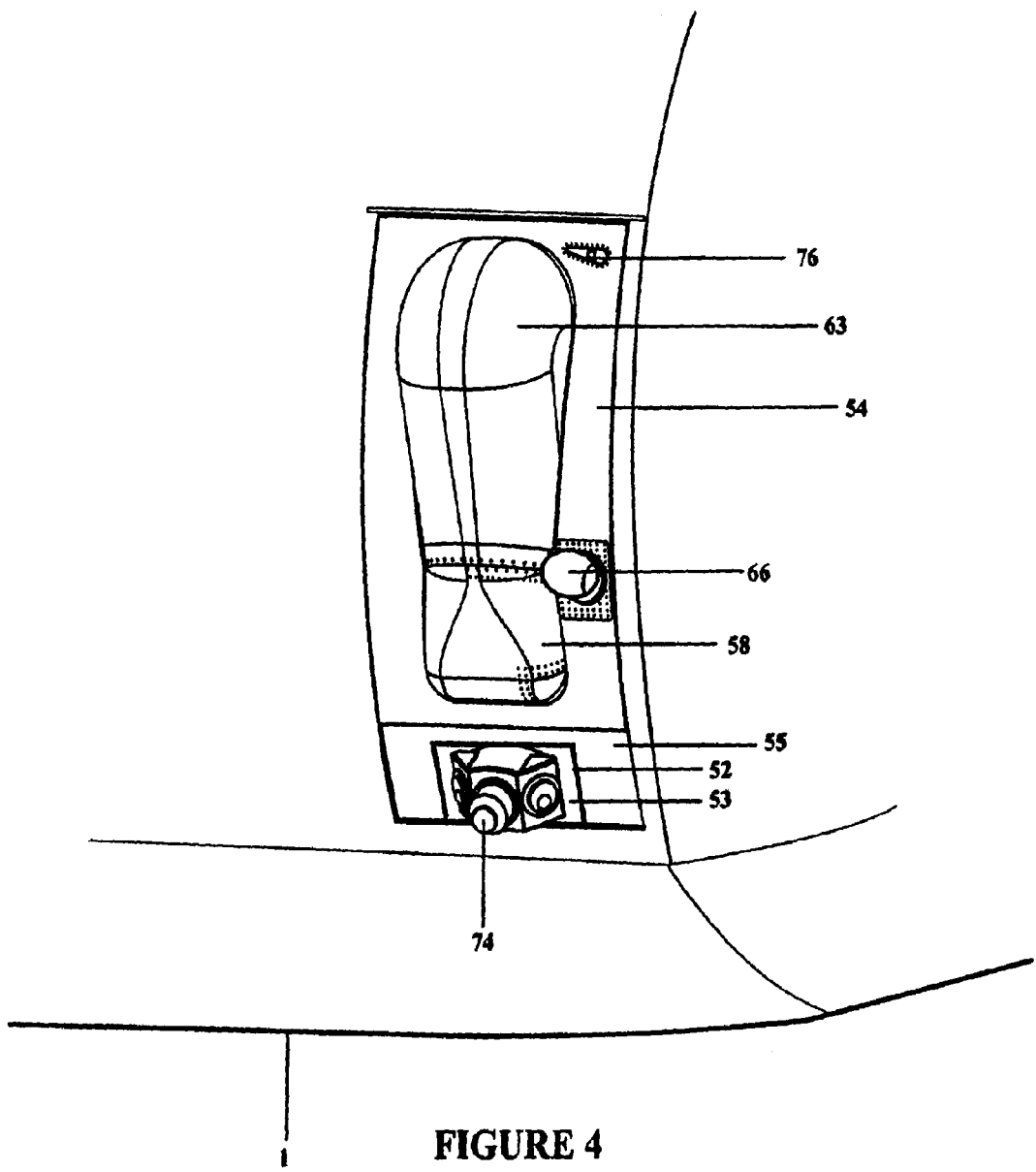
FIG. 4 is an exterior perspective view of a segmented, interlocking, two piece pressurized observer door plug with an electronic warfare aircraft self protection system mounted in the lower door plug panel.
Figure 5A:
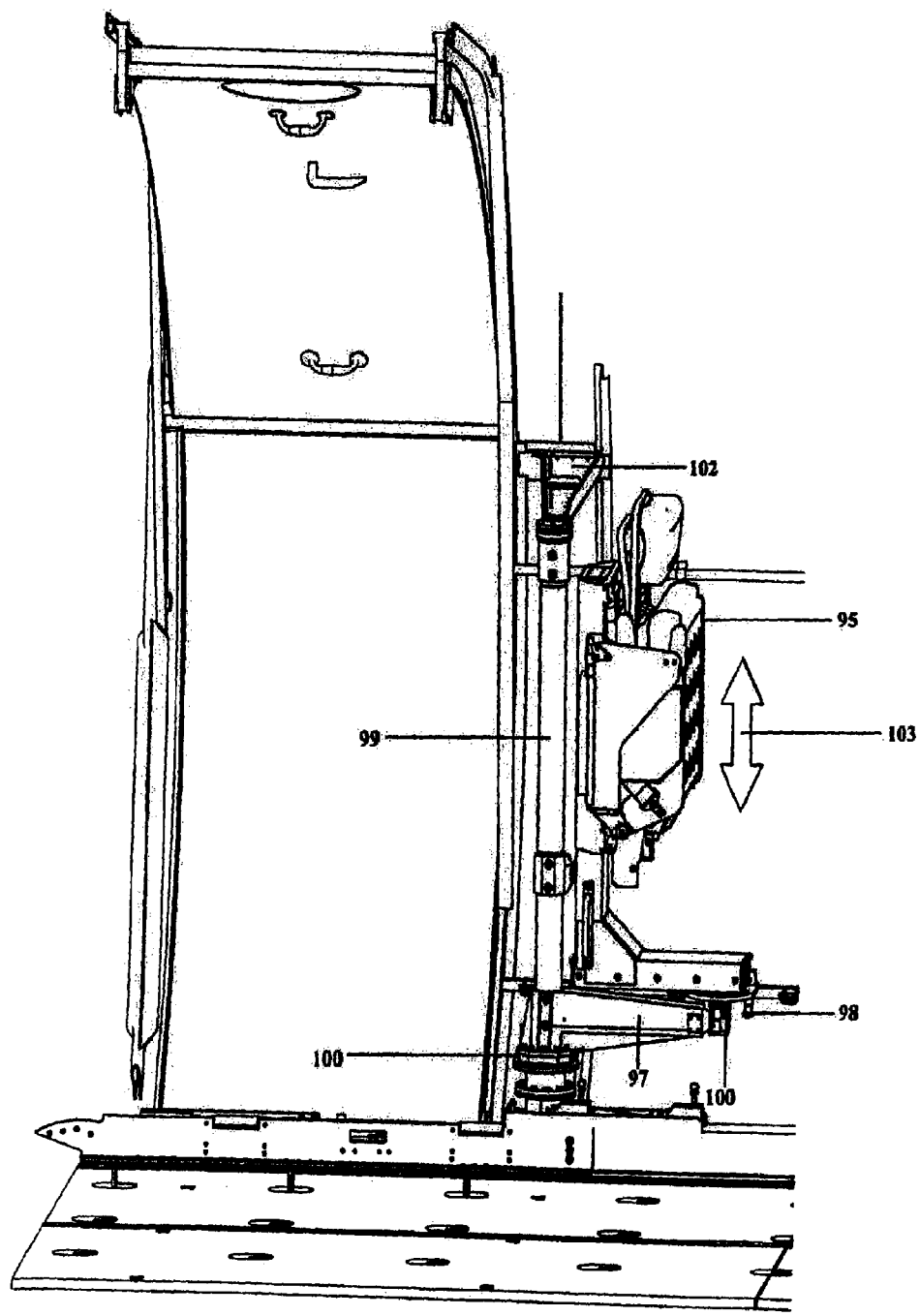
FIGS. 5A-5E are interior perspective views of the observer pivot arm stanchion chair assembly depicting the adjustable motion paths about the subject axis of the chair and stanchion post.
Figure 5B:
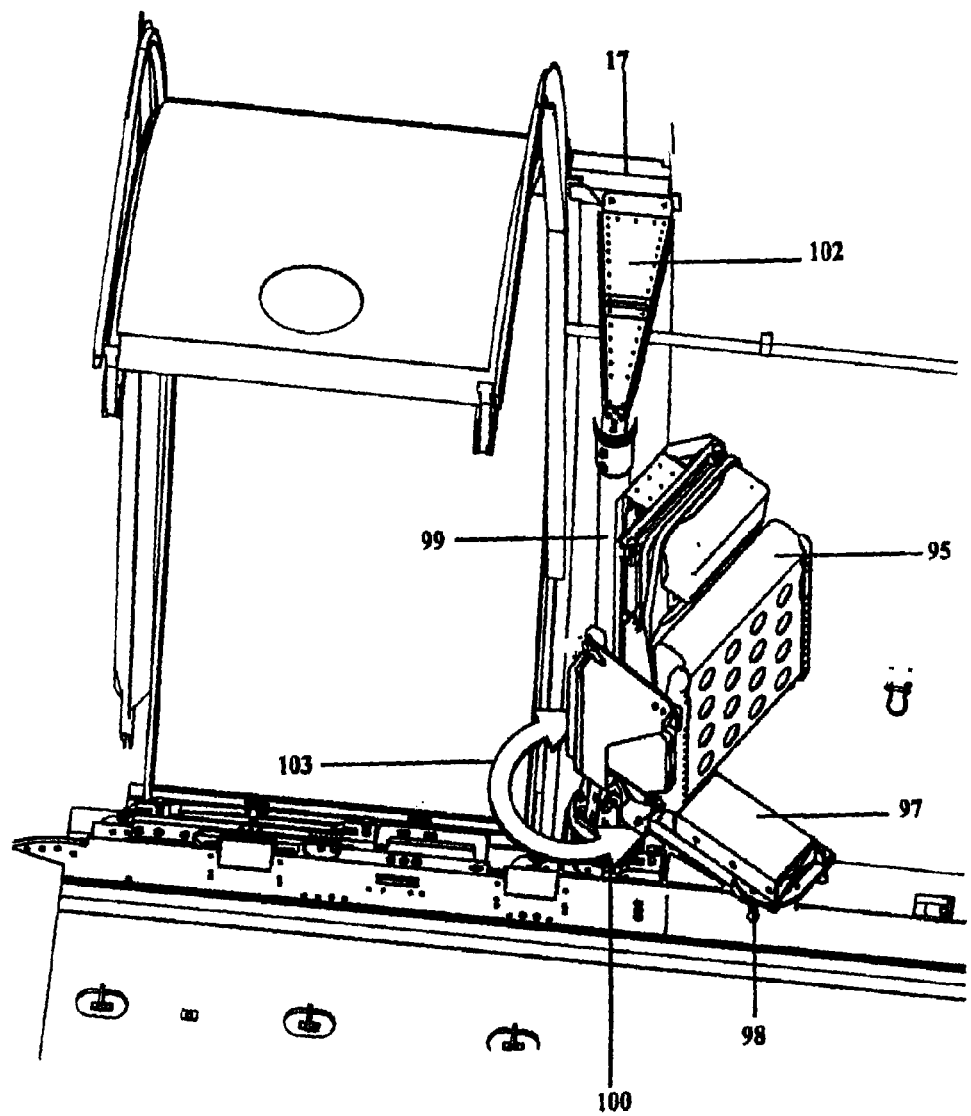
Figure 5C:
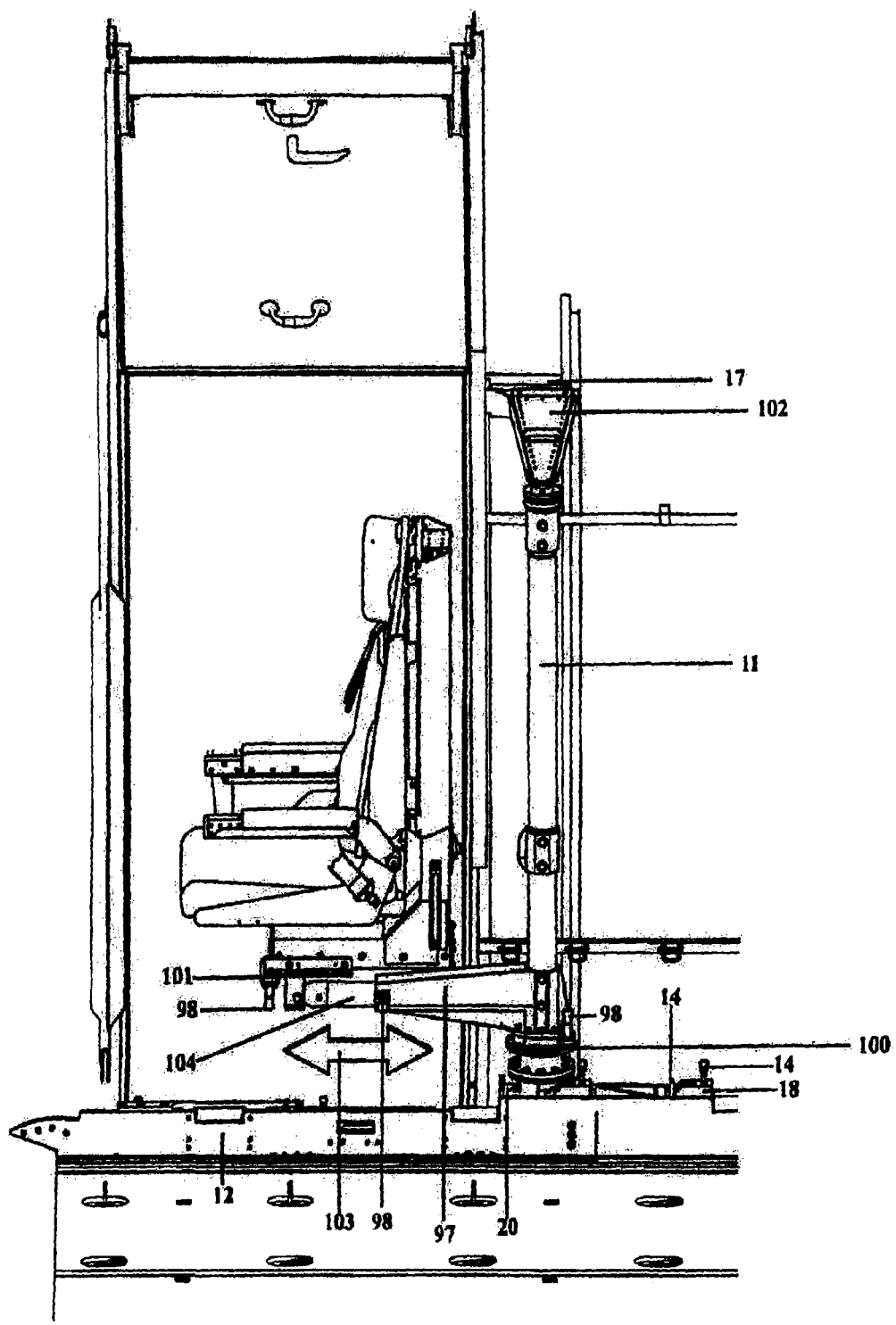
Figure 5D:
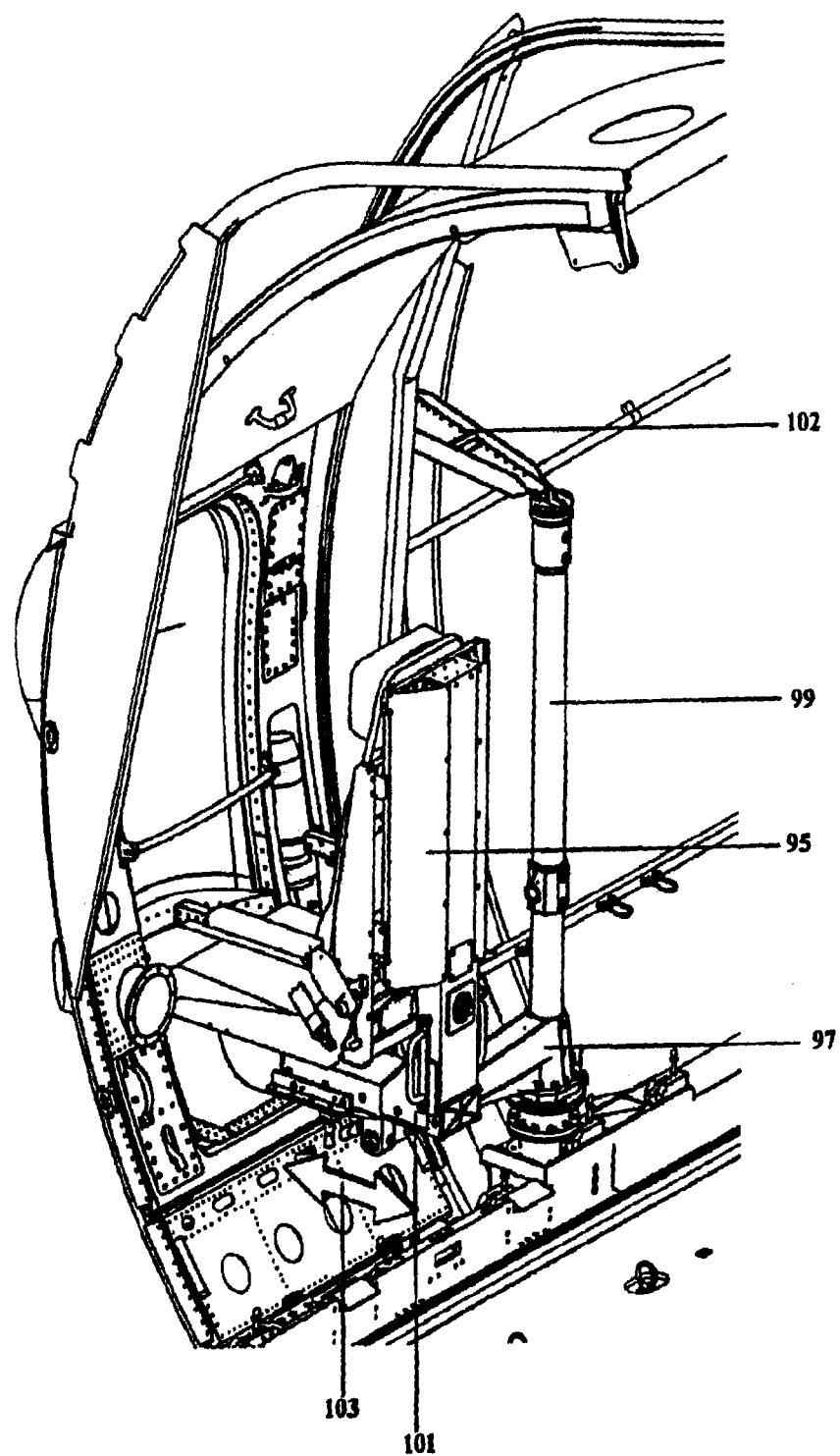
Figure 5E:
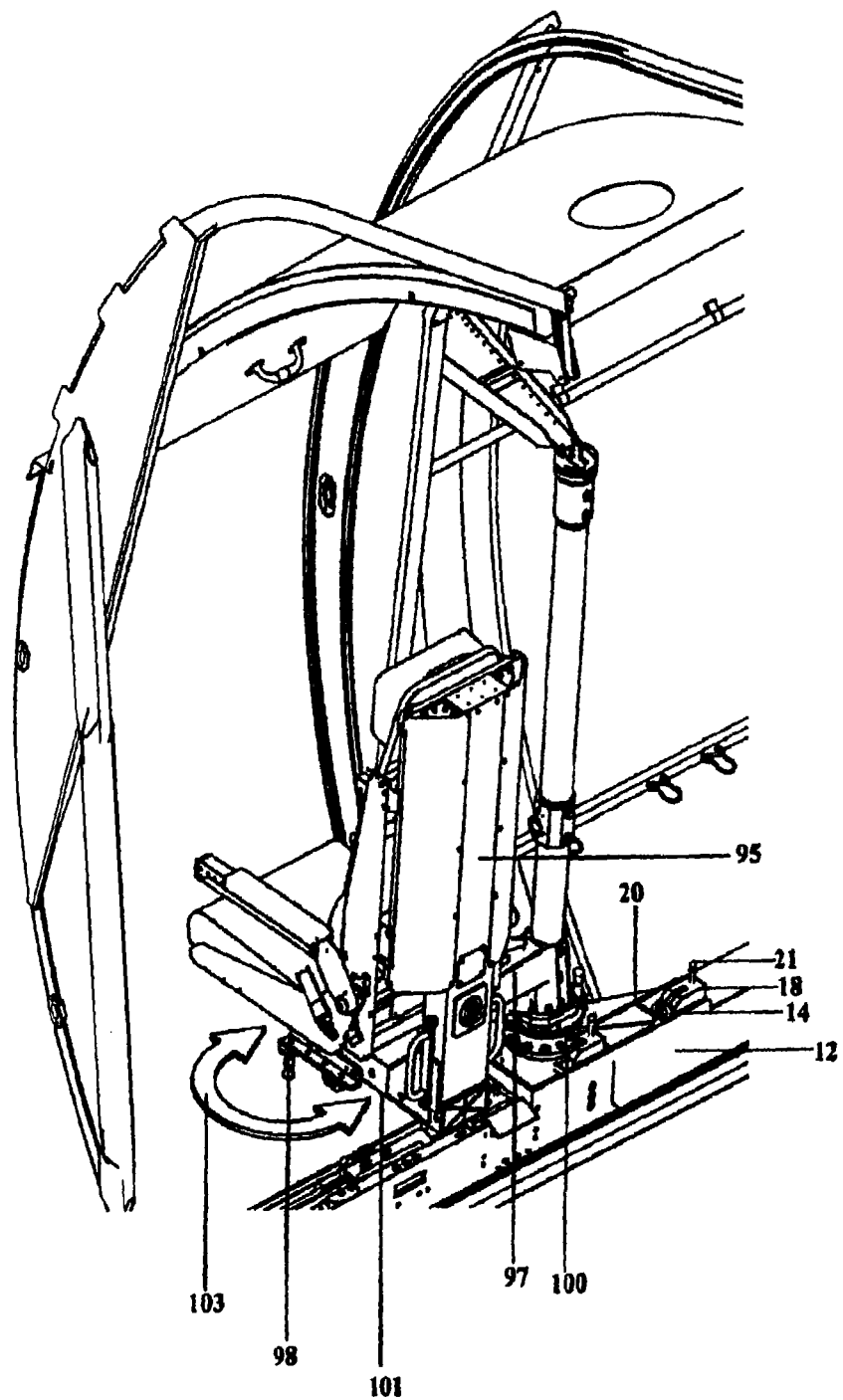

A representative system architecture is depicted in FIGS. 1 through 3 showing one embodiment of the present invention that can include an ADS rail, cargo floor mounted non-dedicated manned observation and sonotube launch and control system, and can include primary sub assemblies which can be used for functionality and employment of the present invention. Sub assemblies include an aircraft, mounting interface assembly, strut assembly, pressurized plug assembly, door plug retract assembly, and a chair assembly, a workstation and control interface assembly. Combined, these various sub assemblies can enable a standard cargo aircraft to be rapidly re-configured as a SAR mission platform, or alternatively, to enable an aircraft to be equipped with a rapidly installed advanced Electronic Warfare Self Protection (EWSP) system which could otherwise not be installed due to the high cost of the systems or dedicated airframe modifications.

Figure 7:
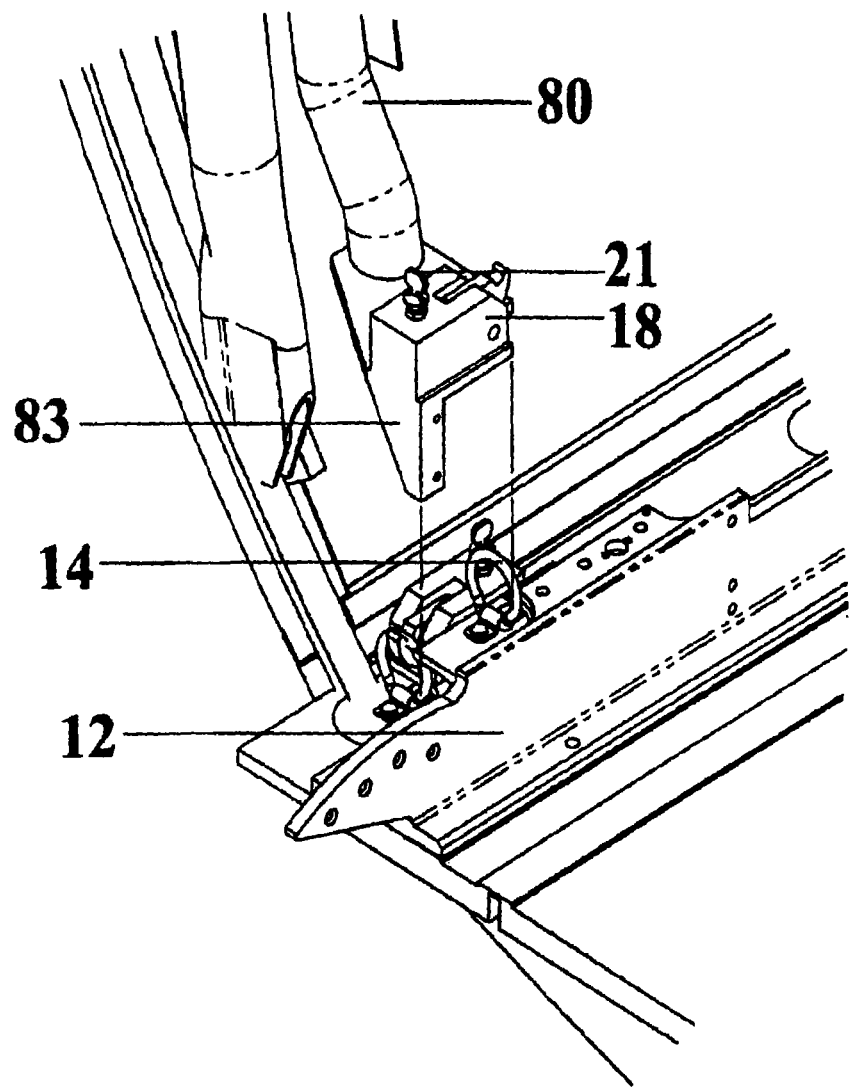
FIG. 7 is a perspective view of the aft lower door plug retraction system attachment details more fully delineating the temporary connection methodologies employed.
Figure 8:
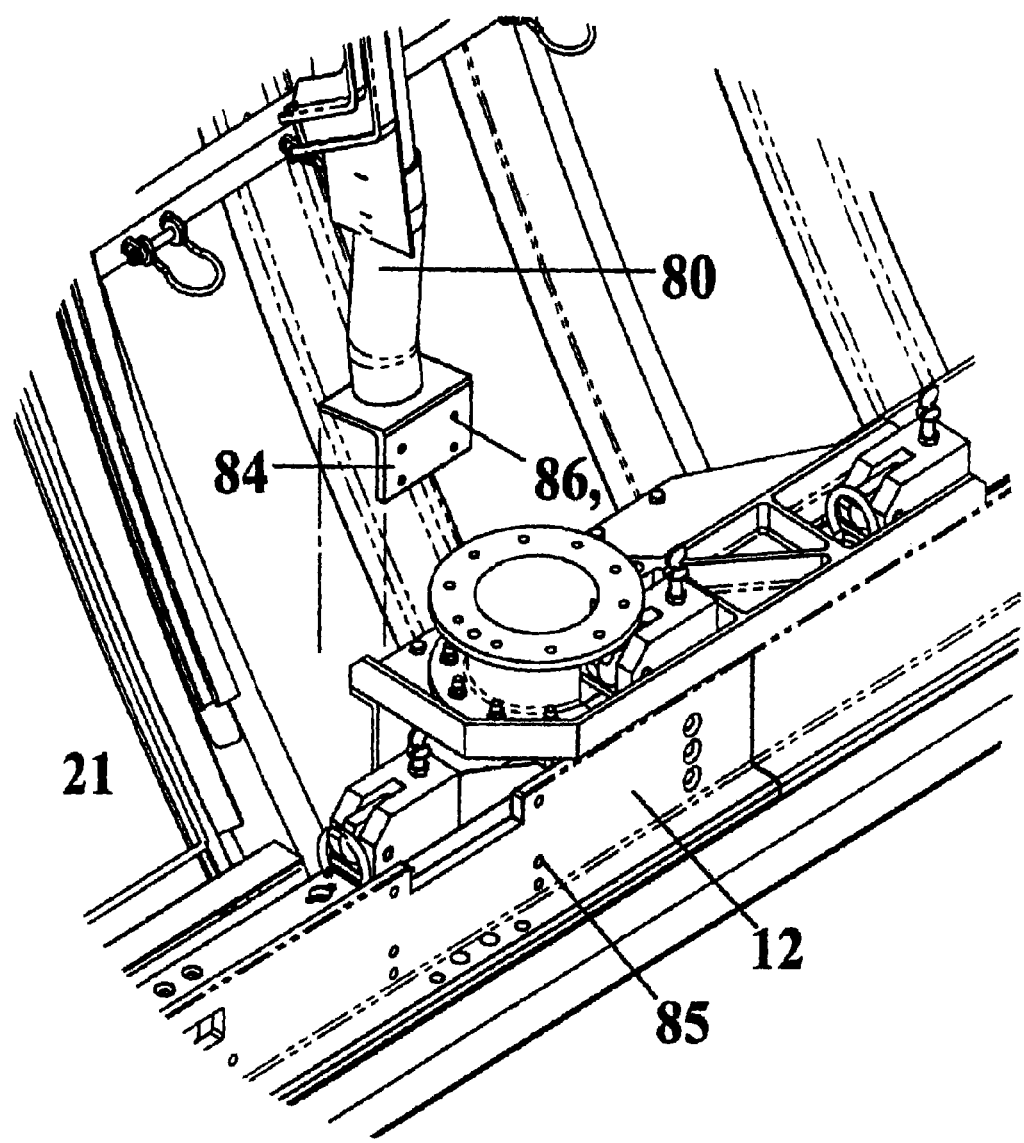
FIG. 8 is a perspective view of the forward lower door plug retraction system attachment details more fully delineating the temporary connection methodologies employed.
Figure 9:
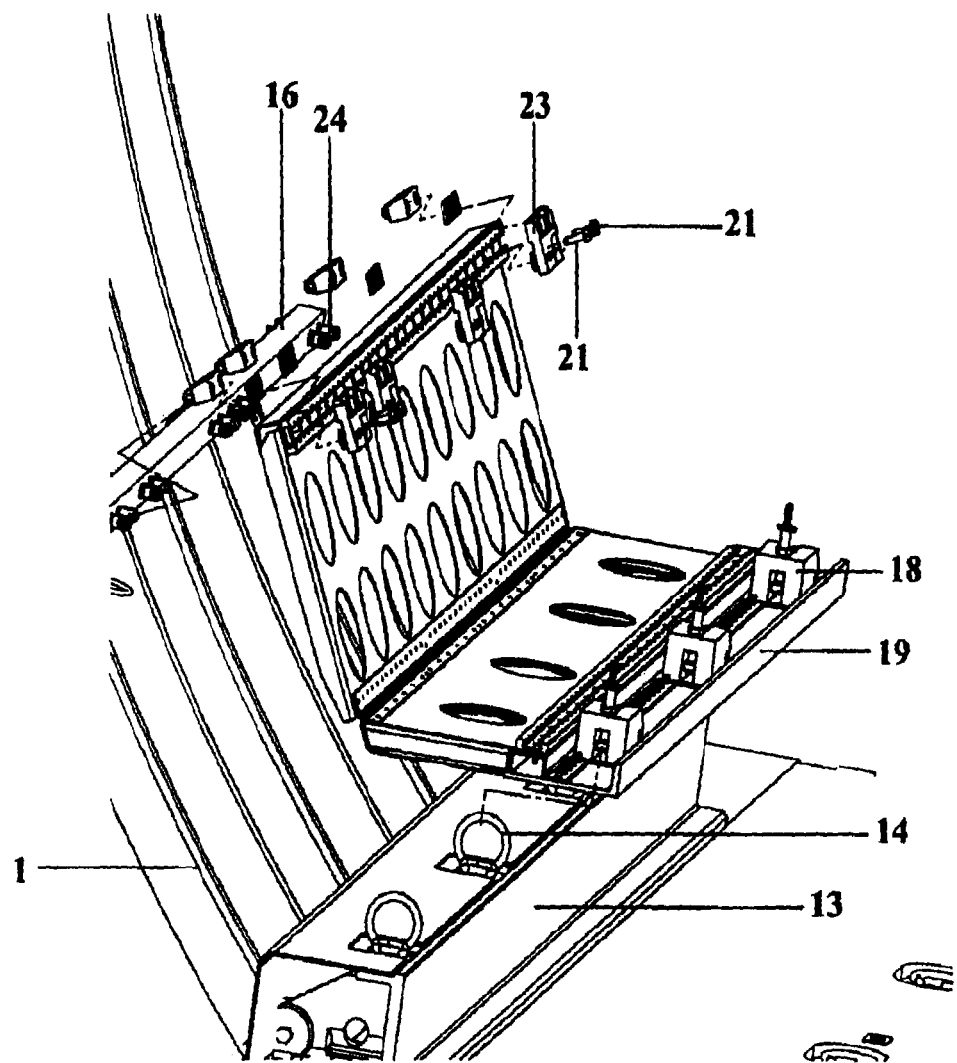
FIG. 9 is a perspective view of the mission LRU rack attachment plate more fully delineating the temporary connection methodologies employed.
Figure 10:
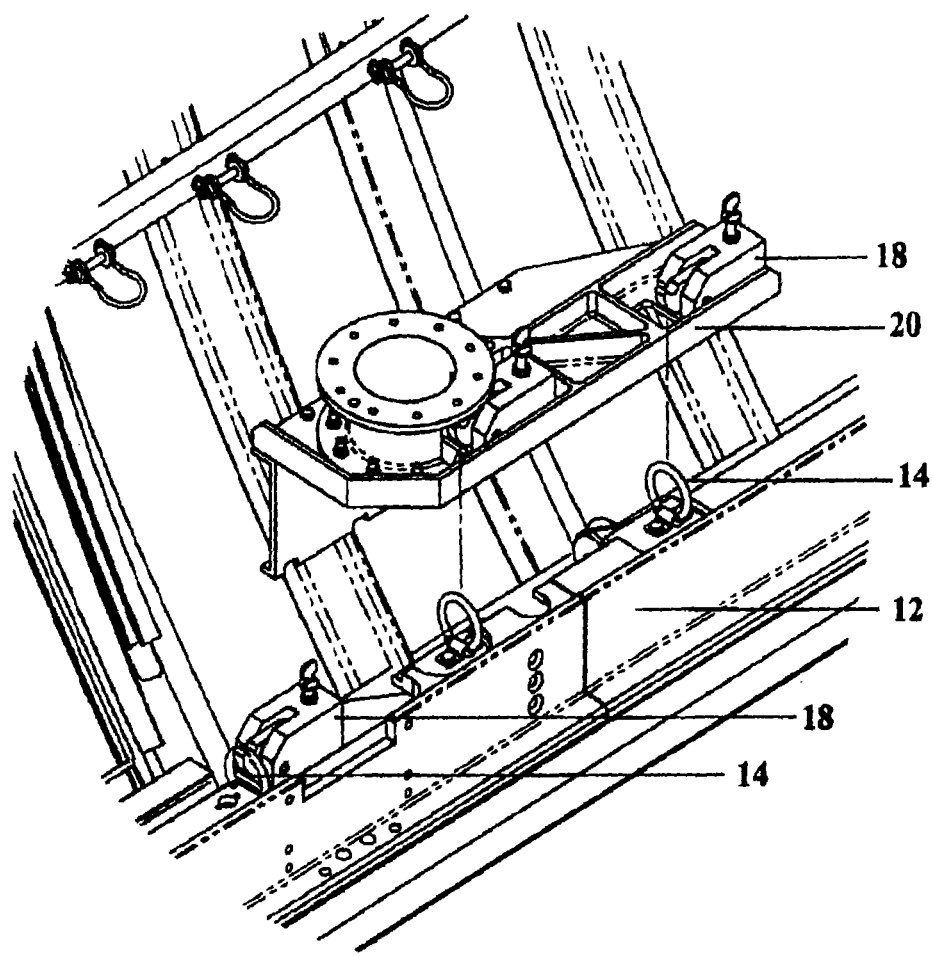
FIG. 10 is a perspective view of the temporary stanchion chair attachment plate more fully delineating the temporary connection methodologies employed.

As shown in FIGS. 1 and 2, the apparatus can be used aboard the host aircraft 1, such as a Lockheed-Martin C-130 aircraft. The existing aircraft door 4 can be removed or opened vertically upward and stowed in the locked position without being removed. The present invention provides the benefit of eliminating the need for palletized systems by incorporating mounting plates that attach to existing aircraft ADS rails and/or cargo tie down rings. As depicted in FIGS. 9 through 10, Installation of the illustrated embodiment of the present invention can begin with attachment of an aft lower rail attachment fitting 83, which is connected to the aft end of the ADS rail 12, using an adjustable CAM lock 18, as depicted in FIG. 7 and further a forward lower rail strut fitting 84, can be connected using multiple restraint bolt 21, means fastened tot eh ADS rail 12, at which point an LRU rack mounting plate 19, can be connected using a plurality of self tightening chock 23, means and a pair of restraint bolt 21, means, connected to several seat belt socket 24 means, and the upper surface of the ADS rail 12, by means of multiple adjustable CAM lock 18 means, and finally a stanchion post mounting plate 20, which is also mechanically connected to the upper surface of the existing ADS rail 12, by means of adjustable CAM lock 18, means to multiple cargo tie down ring(s)

14. Attachment can be by use of conventional aircraft adjustable cam locks 18, tension restraint devices, or by other means familiar to those skilled in the art of aircraft cargo restraint methodologies. If necessary, for example, when installed on Lockheed-Martin C-130 aircraft, mounting plates such as the LRU rack mounting plate 19 can be further connected to the host aircraft 1 by removing the temporary web seating bars and seat belt restraint ring 15 and inserting multiple restraint bolts 21. The stanchion post 99, can be connected to the side of the host Lockheed-Martin C-130 aircraft 1 fuselage at its upper end by means of an upper stanchion brace 102, which can be bolted to a fuselage structural flange 17 by multiple restraint bolts 21.

Mounting plates can be made of any suitable material, such as aluminum or steel, depending on strength and weight constraints. Mounting places can be made in any suitable shape, with the only design requirement being that they provide a surface for mounting the various components of the present invention and can be attachable to the aircraft's existing ADS or cargo tie down rings.

After the various mounting plates and braces are installed, attachment of a door plug retraction rail assembly 80, can be undertaken by connecting upper rail support struts 81 to the existing aircraft door retraction rail guides 6, by means of multiple upper rail attachment fittings 82. The lower part of the temporarily installed door plug retraction rail assembly 80 can be then connected to an existing ADS rail 12 by means of two lower rail attachment fittings 83 and multiple restraint bolts 21. As depicted in FIGS. 1 through 3, the retraction rail assembly 80 may also be pre-assembled as a kit, and installed on the host aircraft with either the one or two piece door plugs positioned within the retraction rail assembly 80.

As depicted in FIG. 3, where an aircraft is not equipped with an ADS rail 12, the present invention may utilized by installing one or multiple adaptive floor plates 13 together with the use of restraint bolts 21 or conventional aircraft adjustable cam locks 18 for tension restraint. The adaptive floor plate 13 can include aircraft type specific bolt patterns unique to the host aircraft, for example an EADS CN-235 aircraft.

After installation of the mounting plates and braces installation of various functional mission assemblies may be undertaken using multiple sequential orders. Alternative functional mission assemblies can be pre-assembled as complete sub assemblies for rapid deployment. Examples of sub assemblies which can be pre-assembled include the chair assembly which can be pre-assembled to the stanchion post 99, the upper stanchion brace 102, and the stanchion post mounting plate 20.

As depicted in FIGS. 1 through 4 the current invention can include a pressurized observer door plug assembly comprised of either a single piece door plug 51, or a segmented two piece door plug incorporating a segmented door plug upper panel 54, and a segmented door plug lower panel 55. In both configurations the pressurized observer door plug assembly utilizes a door strut indent 52, located along its lower periphery to accommodate the installation of a fixed or articulated strut 30 for special mission sensors antennas or other equipment exterior of the aircraft. The pressurized observer door plug assembly accommodates the transit of the fixed or articulated strut 30 from the interior side of the single piece door plug 51, or segmented door plug lower panel 55, to the exterior of the host aircraft while forming a pressurized seal around the fixed or articulated strut 30. When the pressurized observer door plug assembly is used without the installation of a fixed or articulated strut 30, then a door plug close-out panel 53 can be installed within the strut indent 52 to fill in the vacant area and permit either aircraft to be pressurized. As depicted in FIG. 2, mechanical retention and securement of the door plug close-out panel 53 can be achieved by a plurality of operator controlled close out panel latches 77, which can activate a plurality of close out panel lock pins 78, which when extended in the single piece door plug 51, or the segmented door plug lower panel 55, the door strut indent 52 becomes effectively sealed to the outside air permitting the host aircraft to be pressurized.

As depicted in FIGS. 1 through 4, the pressurized observer door plug assembly 4.0, incorporates elements required for manned observation common to both the single piece door plug 51, and a segmented two piece door plug. These elements as installed within either the single piece door plug 51, or the segmented door plug upper panel 54, include a segmented bubble window 63, which incorporates clear glazing in the upper portion of the bubble and a metallic or composite door plug kick panel 58 within the lower portion of the bubble assembly. The segmented bubble window 63 assembly can also provide for a hinged door plug leaning bar 65 and a bubble window air diffuser 64, which can be mechanically ducted and electrically connected to a door plug heater/AC unit 60, and heater, diffuser, light control 61, unit mounted within the observer door plug assembly. Either the single piece door plug 51 or the segmented door plug upper panel 54 can provide for various door plug access panels 62 to gain entrance to the interior of the door for maintenance purposes and the mounting of a gooseneck or other type of NVG compatible door plug light 59. The observer door plug assembly can be powered by various means including a battery or 28 volt DC power coming from the aircraft via a temporarily installed cable harness connected to a floor winch, iron lung or other receptacle familiar to those skilled in the art of aircraft electrical engineering.

As part of the mission hardware suite, and as depicted in FIGS. 1 through 4, the observer door plug assembly can also incorporate a sonotube launch system 67, comprised of a door plug tube port 66, which provides an orifice through either the single piece door plug 51, or the segmented door plug upper panel 54, to enable ejection of sonotube compliant stores. The door plug tube port 66 orifice can be connected to a sonotube iris valve 68 located on the inside of the host aircraft which can be manipulated between the open and closed positions to permit the pressurized ejection of various sonotube compliant stores while the aircraft is pressurized. When not in use, or when required for air drop activities, the sonotube launch system 67, can be equipped with a sonotube hinge 69 and sonotube stowage latch 70 which permits the operator to stow the sonotube launch system 67 along the upper section of either the single piece door plug 51, or the segmented door plug upper panel 54.

The single piece door plug 51 and the segmented door plug upper panel 54 can also be equipped with door plug lift handles 57 and door plug lock pins 56, which effectively emulate the permanent aircraft door 4 lock mechanisms into the fuselage doorway. The two piece door plug configuration can also incorporate two or more interlocking latches 71 which enable the segmented door plug lower panel 55 and segmented door plug upper panel 54 to be joined for the purpose of sealing the door, pressurizing the aircraft, and allowing the segmented door plug lower panel 55 to be disengaged from the segmented door plug upper panel 54 when a payload has been installed on the segmented door plug lower panel 55. One embodiment of the present invention also incorporates the mounting of a modified segmented door plug lower panel 55 equipped with an EWSP missile countermeasures fairing 74, which can be configured for infra-red, radar, and/or RF countermeasure electronics.

As depicted in FIGS. 1 through 3 and FIG. 5 one embodiment of the present invention incorporates an observer chair assembly for the purpose of engaging in manned search, missile scanning, aerial refueling and other operations. The crashworthy observer chair 95 has been designed to articulate vertically about a stanchion post 99 by means of a telescoping pivot arm 97 which can be attached to a stanchion post translation coupling 100 enabling rotation and elevation adjustment about the vertical axis of the stanchion post 99. The chair 95 can also be moved closer to or away from the stanchion post 99, in the horizontal axis by means of a telescoping pivot arm sleeve 104, housed within the outer sleeve of the telescoping pivot arm 97. The observer chair 95, incorporates a translation control lever 98, which enables the chair, and thereby the system operator, to articulate 360 degrees about the vertical axis at the end of the telescoping pivot arm 97. Further, an adjustable slide plate 101 assembly allows the operator to adjust his position away from or closer to the vertical axis centerline at the end of the telescoping pivot arm 97, permitting the observer to move forward into the segmented bubble window 63. Several other aircraft interior mounting locations have been contemplated for the chair assembly, which by way of example and not limitation could include mounting the chair assembly stanchion post 99 and stanchion post mounting plate 20 in onto an aircraft floor 2, and to an alternate upper structural flange 17, on a lowered rear ramp of a Lockheed-Martin C-130 aircraft 1, for rearward vision through the aft cargo area. Other features currently deemed as common practice within the aircraft military chair industry could also provide for the integration of armor, foot rests, heating pads, and other components related to crew comfort and survivability.

As depicted in FIGS. 1 through 3 and FIG. 6 a workstation & control interface assembly can be incorporated within the current invention for the purpose of launching/controlling various sonotube based payloads, undertaking mission specific data processing, communications, EWSP activities and other unique mission systems control functions. The hardware suite required to undertake the control interface functionality and permit stowage outboard of the host aircraft ADS rail 12 can include a collapsible workstation 112, one or more remotely located collapsible armrest mounted control interfaces 121, and at least one or more mission electronics LRU racks 111 housed within a crashworthy cabinet frame.

Figure 6:
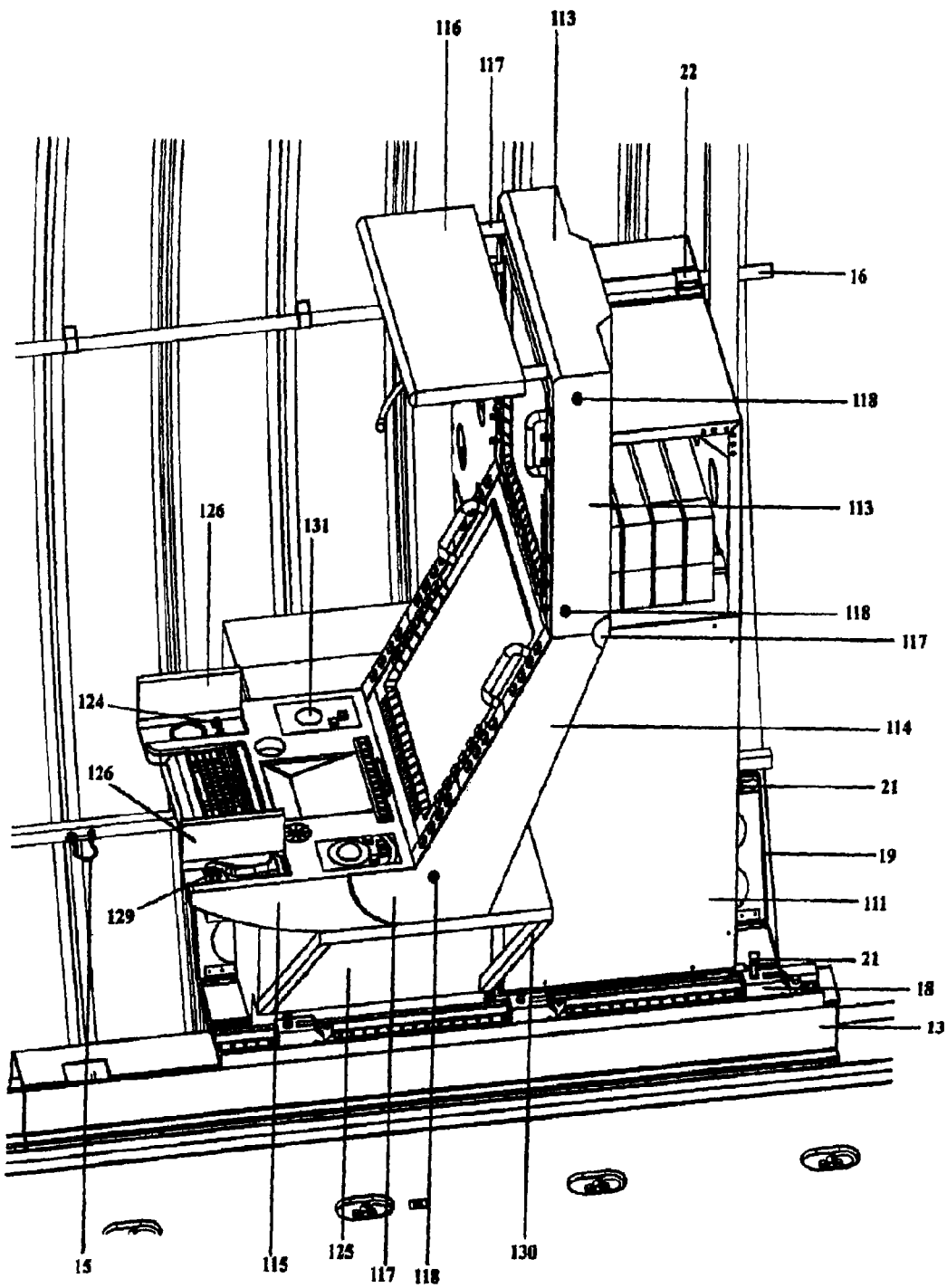
FIG. 6 is a perspective view of the workstation control assembly in the deployed position depicting the oxygen supply reservoir, control system, and user mask.

One embodiment of the present invention as disclosed in FIGS. 1 and 6, include a form fitted reduced height LRU rack 125 and a full height mission electronics LRU rack 111, both of which can be contoured to comply with the fuselage curvature typical of the host aircraft. For example, on a Lockheed-Martin C-130 aircraft 1, the components can be contoured so as to accommodate fitment outboard of the ADS rail 12, and cargo transit envelope where a removable web bench seat could normally be located. The reduced height LRU rack 125, and mission electronics LRU rack 111, can be connected to the LRU rack mounting plate 19 by a plurality of restraint bolts 21 and when required, stabilized vertically by a plurality of attachment clamps 22, temporarily affixed to the host aircraft litter bar 16. The reduced height LRU rack 125 and mission electronics LRU rack 111 generally occupy two mounting positions approximately consistent with the 21 inch electronics LRU mounting rack standard. The LRU rack positions can be able to accommodate either two full height mission electronics LRU racks 111, or one collapsible workstation 112 mounted to the upper surface of a reduced height LRU rack 125.

One embodiment of the current invention also accommodates the temporary mounting and utilization of the collapsible workstation 112, consisting of an upper display module 113, a lower display module 114, a tactile interface module 115, and an overhead module 116, The modules being physically connected and appropriately hinged so as to enable collapse and stowage using a plurality of module locking hinges 117. All modules incorporated within the collapsible workstation 112 can be equipped with self-locking deployed/stowed hinge devices using operator induced module hinge release actuators 118 and other slide rail devices and hinges common to those skilled in the field of flight mechanics, to enable collapse and stowage of the collapsible workstation 112 outboard of the aircraft cargo transit envelope as to permit air drop activities. The collapsible workstation 112, accommodates common control, display, sound and input devices such as a joystick 129, keyboard, track ball, pointing stylus, audio speakers, and display screens. The joystick 129, is described herein as being removable to enable stowage underneath either the left or right side hinged wrist pad 126 within a wrist pad bin 127. To compensate for turbulence induced injuries, and fatigue exerted on the operator, the forward edges of the tactile interface module 115, and the overhead module 116, can be equipped with a chamfered foam edging 128 to provide a soft anthropomorphic interface between the operator and the solid frame of the collapsible workstation 112.

Further as depicted In FIG. 6, as several aircraft types do not have a supplementary oxygen supply, mask, and control system for special mission crew members, the collapsible workstation 112 can incorporate the integration of a self contained oxygen cylinder means housed within the frame of the tactile interface module 115, accessible from a panel below, and a set of oxygen controls 124 housed underneath the left or right side hinged wrist pad 126, within a wrist pad bin 127, and an oxygen mask 122 housed within a rapid access bin on the underside of the tactile interface module 115. The oxygen systems can be typical of the MA-1 assembly manufactured by Scott Aviation of Lancaster, N.Y., USA.

Further as depicted In FIGS. 1 through 3, due to the fact that the collapsible workstation 112 system operator may rotate his chair position between the collapsible workstation 112 and the side looking observer position located in the aircraft doorway, or because flight crew members located in the cockpit, or at other locations on the host aircraft may require remote control interface means and remote electronic connectivity to the workstation & control assembly, the present invention incorporates the integration of one or more collapsible armrest mounted control interfaces 121 connected to the collapsible workstation 112 by data/power cabling familiar to those skilled in the art of aircraft electrical engineering.

In one embodiment of the current invention as it relates to the workstation & control assembly, the invention components can also be electronically interfaced to the aircraft data bus or connected to a modified temporarily mounted, ditching hatch plug 72 (as shown in FIG. 1), equipped with various types of hatch mounted RF antennas 73 and GPS antennas 75 located topside on the fuselage for mission specific line of sight (LOS) and satellite based over the horizon (OTH) communications and telemetry without permanent modification to the host aircraft. The modified ditching hatches are of the type routinely employed on USAF C-130 aircraft and typical of those manufactured by Aerospace Integration Corp, of Crestview, Fla., USA.

METHOD OF OPERATION

The method of operation is described in conjunction with FIGS. 1 through 6 and includes methodologies generally known in the art of cargo restraint methodologies, sonotube ejection systems, manned observation systems, communications, telemetry and control of the sonotube compliant payloads. Therefore, details known to those skilled in the art of aircraft cargo restraint, aircraft payload loading, restraining, and use, are not described in exhaustive detail herein.

In general, the mounting plates of the present invention can be mounted first on their respective components, or they can be mounted first on the aircraft, such as on the aircraft's ADS rail. In the methodology described herein, the various mounting plates are considered to have been already attached to their respective mission components. The methodology of installation and operation as described herein is divided into seven functional areas. The installation of a temporarily mounted fixed or articulated strut 30, although referenced briefly herein, is not described further with regard to operation as it is described in detail in a parallel patent filed by Woodland & Neyedly with the U.S. Patent & Trademark Office (USPTO) as part of a family of related special mission inventions undergoing simultaneous filing. Further, although the present invention can be utilized on various types of aircraft, the methodology below is described with respect to a rear-loading C-130 type aircraft.

System Transport & Loading—Upon notification of a mission, a ground crew that can be comprised of two individuals could ship the present invention within a plurality of man portable, ruggedized transport cases to the host aircraft. After an initial confirmation that the host aircraft is flight ready, the rear ramp could be lowered and the transport cases loaded onto the aircraft. In one embodiment of the invention, the loading can be achieved without the use of a mechanized loader, the components and assemblies being light enough that two individuals can undertake the loading and installation.

Aircraft Preparation—Initially the install crew could open, stow, or remove one or more side door(s), such as a left side paratrooper door, to create an orifice with which to accommodate fitment of the pressurized observer door plug assembly. One or more of the upward host aircraft ditching hatches 5, could also be removed to accommodate one or more specialized ditching hatch plugs 72 to provide specialized mission telemetry, and communications capabilities. Once the host aircraft ditching hatch 5 has been removed, the web seating bench located forward of the paratroop door(s) can be removed and stowed. If a fixed or articulated strut 30 is used with the present invention then a section of the existing ADS rail 12 could also be removed to accommodate its installation abreast of the open doorway.

Workstation And Control Interface Assembly—The installation of the various electronics and user interface assemblies of the present invention begins with the mission electronics LRU rack 111, and reduced height LRU rack 125, wherein as stated in the operational description, these components can be pre-connected to the LRU rack mounting plate 19, which in turn is temporarily attached to the host aircraft floor 2, and host aircraft fuselage 3, by means of an ADS rail 12, or an adaptive floor plate 13. The fastening methodologies used as described herein can include a plurality of aircraft cargo tie down rings 14 and removal of the seat belt restraint rings 15, a litter bar 16, using a plurality of restraint bolts 21 and attachment clamps 22. Once the reduced height LRU rack 125 is installed together with a collapsible workstation 112, the installation crew could attach it to the top of the reduced height LRU rack 125, using a plurality of collapsible workstation slide rails 130. The installation crew could then extend the collapsible workstation 112 by releasing a plurality of module locking hinges 117 by depressing multiple module hinge release actuators 118. Once fully extended and secured to the top of the reduced height LRU rack 125, one crew member could lift the hinged wrist pad 126, and remove the joystick 129, from wrist pad bin 127, to insert in either a left or right hand joystick socket 131, located on the tactile interface module 115. At this point in the installation process, the collapsible workstation 112, mission electronics LRU rack 111, reduced height LRU rack 125, and the ditching hatch plug 72, can be inter-connected by a power and data relay/control cable and approved electrical power from the host aircraft using materials and methods familiar to those skilled in the art of aircraft electrical engineering.

Observer Chair Assembly—The observer chair 95, equipped with a pair of chair armrests 96, a translation control lever 98, and an adjustable slide plate 101, could be pre-assembled with the stanchion post 99, integrating in one assembly the stanchion post translation coupling 100, telescoping pivot arm 97, and upper stanchion brace 102, with the observer chair 95. The size and weight of this assembly can be quite manageable by two crew members who can connect the stanchion post mounting plate 20 to the host aircraft floor 2, using adjustable cam lock 18, means interfaces to a plurality of cargo tie down ring 14, means mounted on the surface of an ADS rail 12, or an adaptive floor plate 13. The stanchion post 99 also can be secured at the upper end to the host aircraft fuselage 3 by an upper stanchion brace 102 and a plurality of restraint bolts 21, which can be connected to a structural flange 17 on the host aircraft. Once the observer chair 95 is installed the crew can mount the collapsible armrest mounted control interface 121, and the chair armrest 96, and connect them to the collapsible workstation 112 by means of a power and data cable harness. Depending on the nature of the mission(s) and the requirement for user interfaces, the collapsible armrest mounted control interface 121 may be positioned simultaneously at multiple locations in the aircraft necessitating a variety of temporarily installed cable harness configurations familiar to those skilled in the art of aircraft electrical engineering.

Pressurized Observer Door Plug Assembly—Installation of the temporary observer door plug and retraction rail assembly 80 for the purposes of this description of methodology assumes that either of the the single piece door plug 51 or the two piece door plug comprised of a segmented door plug upper panel 54 and a segmented door plug lower panel 55 is pre-assembled with the retraction rail assembly 80, and does not require placement of a door plug close-out panel 53, or operation of the door plug lock pins 56. In one embodiment of the present invention, the design addresses the installation of the complete door plug assembly by two individuals by aligning the upper rail support struts 81, of the retraction rail assembly 80, with the existing aircraft door retraction rail guides 6, and secures a plurality of upper rail attachment fitting 82 using restraint bolts 21 or other attachment clamps 22, or rotating cam means familiar to those skilled in the art of aircraft mechanical systems engineering. The lower parts of the retraction rail assembly 80 are connected to the to the host aircraft floor 2 using a pair of fore and aft lower rail attachment fittings 83, which can interface to the door retract mounting plate(s) 11, and are secured by several adjustable cam locks 18, and/or restraint bolts 21 interfaced to a plurality of cargo tie down rings 14 mounted on the surface of an ADS rail 12 or an adaptive floor plate 13. Once the pressurized observer door plug assembly has been installed, the sonotube launch system 67 can be removed from its case and attached to the sonotube iris valve 68 mounted within either the single piece door plug 51 or segmented door plug upper panel 54. The tube comprising the majority of the sonotube launch system 67 can be physically attached to the sonotube iris valve 68 using a plurality of bayonet latches which secure the tube in place once it has been inserted into the bayonet recesses and rotated, which locks the sonotube launch system 67 in place.

System Functionality Check—The installation completed, the crew could then undertake a self diagnostics status verification test of the collapsible workstation 112 and the onboard LRU processing system. This could include all displays, input and output devices, cable connections to the hatch mounted RF Antenna 73, GPS Antenna 75, EWSP Missile Countermeasures Fairing 74, telemetric links to the payload stores of the sonotube launch system 67, one or more the collapsible armrest mounted control interface 121, and the aircraft data bus (if required). Additional status verification could include physical inspection and operability of the self contained oxygen system within the collapsible workstation 112 by lifting the hinged wrist pad 126, to expose the oxygen controls 124, and removing the oxygen Mask 122, to verify the oxygen cylinder 123, was providing the requisite oxygen at the specified flow rates. Additional functional testing could be undertaken to assess operability of the door plug Retract assembly 5.0, to verify pressurized closure of the fuselage door plug lock pins 56, the segmented door plug interlocking latches 71, and the heater, diffuser, light control 61, could also be tested for operability and secure detent positioning. The door mounted sonotube launch system 67, could also be checked for rated pressurization of the launch cylinders, clearances of FOD from door plug tube port 66, Operability of the sonotube iris valve 68, and operability of the sonotube hinge 69, and sonotube stowage latch 70, assemblies. The functionality of the observer chair 95, in all its operable axis and adjustment modes is also undertaken and the telescoping pivot arm 97, extended to the bubble window observation position, A final inspection of all system electrical cable harnesses, and structural interface attachment points which have been fitted with temporary restraint bolt 21, means, attachment clamps 22, and adjustable cam lock 18, can be undertaken prior to approval for flight.

In Flight Operation—With the system of the present invention in the deployed position aboard the host aircraft, the crew can engage in manned search or scanning operations. As depicted In FIGS. 5A, 5B, 5C, 5D, 5E, and 5F, the observer chair 95 can be rotated about the stanchion post 99 to move back and forth between the collapsible workstation 112, and the segmented bubble window 63. The operator is also able to rotate his chair through 360 degrees about the end of the telescoping pivot arm 97 to achieve various viewing positions including positions advantageous for take-off or landing, lateral mission scanning, or 45 degrees in either forward or aft positions. Further, depending on height adjustment the chair can be elevated in the vertical about the stanchion post 99 by means of the stanchion post translation coupling 100. When viewing subjects of opportunity from the segmented bubble window 63 the operator can adjust the chair forward and back into the window envelope using an adjustable slide plate 101 and translation control lever 98. All adjustments and articulations can be achieved by known means as known in the art.

As depicted in FIG. 2, when the chair is not required, or when back end air drop missions are being undertaken, the observer chair 95, collapsible workstation 112, and sonotube launch system 67 can be folded away outboard of the ADS rail 12 or cargo envelope to allow pallets and other cargo to egress towards the rear of the aircraft. When the host aircraft is engaged in paratroop drop operations through the door which the present invention is mounted in, then the pressurized observer door plug assembly lock mechanisms can be disengaged by the door lock handle 76 located towards the upper left of the door assembly, which can be opened upward as it could normally operate to allow the paratroopers to egress without being constrained by the various components and appendages of the present apparatus.

When utilizing the sonotube launch system 67, images from various jettisoned sonotube compatible payloads can be received by the host aircraft. With the workstation & control assembly installed, dynamically launched MUAV's can be tasked, and data analyzed by the host aircraft and then relayed to other aircraft, surface assets, or to distant control centers using OTH telemetry provided by the specially equipped ditching hatch plug 72. Further, when deploying multiple sonotube buoys or like packages the ditching hatch plug 72, provides GPS location data such that a grid of coordinated positions can be determined for precision delivery of the sonotube packages, particularly if sonotube launch system 67, is equipped with multiple launch tubes, or incorporates a cartridge system similar that being developed by Sea Corp of Rhode Island, USA.

It could be obvious to those skilled in the art of aircraft special mission systems that the overall system of the present invention as described herein has extensive ability to interface with and otherwise accommodate numerous other missions when augmented with external sensors, communications, electronic warfare systems, unmanned vehicles or other stores, not described in detail within this patent. While certain embodiments have been shown and described, various substitutions and modifications may be made without departing from the spirit and scope of the invention. Accordingly it is to be understood that the present invention has been described by way of illustration and not limitation.

What is claimed is:

1. A pressurized aircraft observer door plug assembly comprising:
a segmented two-piece observation bubble comprising a protruding upper segment portion and a protruding lower segment portion, wherein:
the upper segment portion comprises a transparent glazing;
the lower segment portion comprises a composite or metal protruding kick panel; and
the segmented two-piece observation bubble is continuous in shape from the upper segment portion through the lower segment portion.

2. The pressurized aircraft door plug assembly of claim 1, wherein the pressurized aircraft door plug assembly is a segmented two-piece pressurized aircraft door plug assembly, further comprising:
a door plug upper panel comprising the segmented two-piece observation bubble; and
a door plug lower panel.

3. The pressurized aircraft door plug assembly of claim 2, further comprising two or more interlocking latches that are operable to:
join the door plug lower panel and the door plug upper panel; and
disengage the door plug lower panel from the door plug upper panel.

4. The pressurized aircraft door plug assembly of claim 2, further comprising:
a tube port that provides an orifice through the door plug upper panel; and
a valve interfaced with the tube port that is operable between an open position and a closed position.

5. The pressurized aircraft door plug assembly of claim 4, further comprising a sonotube launch system that is operable to interface with the valve.

6. The pressurized aircraft observer door plug assembly of claim 1, further comprising:
one or more upper rail support struts operable to interface with one or more door retraction rail guides of an aircraft.

7. The pressurized aircraft observer door plug assembly of claim 1, wherein a lower part of the pressurized aircraft observer door plug assembly is operable to interface with one or more of:
an air deployment system rail of an aircraft; or
one or more adaptive floor plates operable to interface with a floor of an aircraft.

8. The pressurized aircraft observer door plug assembly of claim 1, further comprising:
an observer chair assembly comprising:
a stanchion post operable to interface with a floor of an aircraft;
a telescoping pivot arm operable to interface with the stanchion post; and
an observer chair operable to interface with the telescoping pivot arm;
wherein the observer chair assembly is operable to move the observer chair into the segmented two-piece observation bubble.

9. A segmented two-piece pressurized aircraft door plug assembly comprising:
a door plug upper panel; and
a door plug lower panel which is contoured and indented about its lower proximity to accommodate a pressurized seal around the periphery of an articulated- or fixed-position payload strut which transits from the interior to the exterior of an aircraft.

10. The segmented two-piece pressurized aircraft door plug assembly of claim 9, further comprising two or more interlocking latches that are operable to:
join the door plug lower panel and the door plug upper panel; and
disengage the door plug lower panel from the door plug upper panel.

11. The segmented two-piece pressurized aircraft door plug assembly of claim 9, further comprising:
one or more upper rail support struts operable to interface with one or more door retraction rail guides of an aircraft.

12. The segmented two-piece pressurized aircraft door plug assembly of claim 9, wherein a lower part of the pressurized aircraft observer door plug assembly is operable to interface with one or more of:
an air deployment system rail of an aircraft; or
one or more adaptive floor plates operable to interface with as a floor of the aircraft.

13. The segmented two-piece pressurized aircraft door plug assembly of claim 9, further comprising:
a tube port that provides an orifice through the door plug upper panel; and
a valve interfaced with the tube port that is operable between an open position and a closed position.

14. The segmented two-piece pressurized aircraft door plug assembly of claim 13, further comprising a sonotube launch system that is operable to interface with the valve.

15. A segmented two-piece pressurized aircraft door plug assembly comprising:
a door plug upper panel comprising a segmented two-piece observation bubble window assembly comprising an upper segment portion and a lower segment portion, wherein:
the upper segment portion comprises a transparent glazing; and
the lower segment portion comprises a composite or metal protruding kick panel; and
a door plug lower panel which is contoured and indented about its lower proximity to accommodate a pressurized seal around the periphery of an articulated- or fixed-position payload strut which transits from the interior to the exterior of an aircraft.

16. The segmented two-piece pressurized aircraft door plug assembly of claim 15, further comprising two or more interlocking latches that are operable to:
join the door plug lower panel and the door plug upper panel; and
disengage the door plug lower panel from the door plug upper panel.

17. The segmented two-piece pressurized aircraft door plug assembly of claim 15, further comprising:
one or more upper rail support struts operable to interface with one or more door retraction rail guides of an aircraft.

18. The segmented two-piece pressurized aircraft door plug assembly of claim 15, wherein a lower part of the pressurized aircraft observer door plug assembly is operable to interface with one or more of:
an air deployment system rail of an aircraft; or
one or more adaptive floor plates operable to interface with as a floor of the aircraft.

19. The segmented two-piece pressurized aircraft door plug assembly of claim 15, further comprising:
a tube port that provides an orifice through the door plug upper panel;
a valve interfaced with the tube port that is operable between an open position and a closed position; and
a sonotube launch system that is operable to interface with the valve.

20. The segmented two-piece pressurized aircraft door plug assembly of claim 15, further comprising:
an observer chair assembly comprising:
a stanchion post operable to interface with a floor of an aircraft;
a telescoping pivot arm operable to interface with the stanchion post; and
an observer chair operable to interface with the telescoping pivot arm;
wherein the observer chair assembly is operable to move the observer chair into the segmented two-piece observation bubble window assembly.

\* \* \* \* \*